United States Patent [19]

Habibullah

[11] Patent Number: 4,616,052
[45] Date of Patent: Oct. 7, 1986

[54] HIGH TEMPERATURE CREEP RESISTANT THERMOPLASTIC ELASTOMER COMPOSITIONS

[75] Inventor: Mohammed Habibullah, Flanders, N.J.

[73] Assignee: Becton, Dickinson and Company, Franklin Lakes, N.J.

[21] Appl. No.: 752,276

[22] Filed: Jul. 5, 1985

[51] Int. Cl.⁴ .................................................. C08K 5/34
[52] U.S. Cl. ..................................... 524/104; 525/211; 524/526
[58] Field of Search ................. 524/104, 526; 525/211

[56] References Cited

U.S. PATENT DOCUMENTS

| Re. 31,518 | 2/1984 | Fischer | 525/211 |
|---|---|---|---|
| Re. 32,028 | 11/1985 | Fischer | 525/211 |
| 3,451,962 | 6/1969 | Auler et al. | 525/211 |
| 3,835,201 | 9/1974 | Fischer | 525/211 |
| 3,941,744 | 3/1976 | Murayama et al. | 524/104 |
| 4,046,840 | 9/1977 | Carman et al. | 525/211 |
| 4,116,929 | 9/1978 | Pond | 524/104 |
| 4,130,535 | 12/1978 | Coran et al. | 525/211 |
| 4,210,686 | 7/1980 | Gajewski et al. | 423/35 |
| 4,271,049 | 6/1981 | Coran et al. | 260/4 R |
| 4,304,712 | 12/1981 | Lai | 524/92 |
| 4,440,815 | 4/1984 | Zomorodi et al. | 428/35 |
| 4,444,330 | 4/1984 | Kasai et al. | 215/247 |
| 4,460,741 | 7/1984 | DuFour et al. | 525/64 |
| 4,464,500 | 8/1984 | Diamond et al. | 525/211 |
| 4,480,074 | 10/1984 | Wang | 525/211 |
| 4,500,679 | 2/1985 | DuFour | 525/64 |
| 4,501,861 | 2/1985 | Woodbrey | 525/421 |
| 4,507,415 | 3/1985 | Kasai et al. | 524/101 |
| 4,508,870 | 4/1985 | DuFour et al. | 525/64 |

*Primary Examiner*—Joseph L. Schofer
*Assistant Examiner*—N. Sarofim
*Attorney, Agent, or Firm*—Robert P. Grindle

[57] ABSTRACT

Elastomer compositions are provided for use in preparing objects such as stoppers and pistons for use, for example, in such items as evacuated tubes or syringes for a variety of medical applications. The compositions of the invention are particularly appropriate for producing objects capable of withstanding, simultaneously, the effects of autoclaving temperatures and creep, related to the stress placed on the objects related to the positioning of the objects in use.

7 Claims, No Drawings

HIGH TEMPERATURE CREEP RESISTANT THERMOPLASTIC ELASTOMER COMPOSITIONS

BACKGROUND AND STATEMENT OF THE INVENTION

Generally speaking, this invention relates to elastomer compositions for use in preparing objects such as stoppers to be placed in syringes, and evacuated tubes such as Vacutainer brand evacuated tubes, a product of Becton, Dickinson and Company, Paramus, N.J. 07652. Such tubes have a vacuum applied to them and it is important that that vacuum be maintained during storage life, and use of the evacuated container. For the syringes, it is important that the stoppers maintain sealing engagement with the cooperating walls of the syringe tube. These products, sterilized either by Ethylene Oxide or by high energy radiation are sold in the market as sterile product. However, resterilization of these devices by autoclaving is practiced by the users.

Currently vulcanized elastomers such as natural or butyl rubber are used for making the above products. Although the vulcanized elastomers provide autoclavability or stability at elevated temperatures there are certain drawbacks in comparison with thermoplastic elastomers. Various additives must be incorporated into vulcanized elastomers making them prone to toxicity, whereas less additives are required to produce a thermoplastic elastomer. Vulcanized products are process (molding) limited and labor intensive, whereas thermoplastic elastomer products can be fabricated in different processes making them more economically attractive. However, although thermoplastic elastomers behave as vulcanized elastomers at room temperature, their properties at elevated temperatures rapidly change. At high temperatures, thermoplastic elastomers will creep more than the vulcanized materials. The state-of-the-art of this invention is that the said composition is medically clean, capable of fabrication in any molding process, and will maintan required sealing properties at elevated temperatures such as are seen in autoclaving. Thus, attempts have been made to develop synthetic elastomer compositions which may be substituted for natural rubber in preparing stoppers for such items as evacuated tubes for the collection of medical samples, and for syringe stoppers for the administration of various medications. Other applications where the sealing properties of synthetic elastomers are of importance include O-rings, and hoses carrying high temeprature fluids including steam lines and automotive applications.

While a variety of different compositions have been developed which will provide the appropriate resiliency required to maintain proper seal, as discussed above, such compositions will not always tolerate the elevated temperatures required to bring about the proper autoclaving sterilization of the containers. As a result, even though the stoppers provide appropriate vacuum and/or sealing prior to such sterilization, the high temperatures have a tendency to break down the elastomer composition to the degree where high compression set takes place, so that after a period of storage life, the stoppers leak or in other ways fail in their use.

Attempts have been made to deliberately modify elastomer compositions in order to make them resistant to autoclave temperatures. Representative compositions for providing autoclavable elastomer compositions are taught, for example in U.S. Pat. Nos. 4,210,686 and 4,440,815. However, the compositions taught in those patents, while providing appropriate resistance to autoclave temperatures, are not compositions which will produce objects, such as stoppers, which are placed under stress when they are put into the position of use, and then autoclaved under the stress conditions. That is, as will be understood by practitioners-in-the-art, stoppers placed in evacuated tubes or used as stoppers and/or pistons movable in syringes are placed under stress. The imposed stress during the period of autoclaving exposure to high temperatures, has the effect of generating creep by breaking down the elastomer composition and causing resulting failures in storage and in use.

With this invention, by contrast, compositions are provided which provide elastomeric objects which withstand, simultaneously, the effects of autoclaving temperatures, and the stress placed on the objects during the period of time when they are being autoclaved. Thus, stoppers produced from the compositions, in accordance herewith, will maintain their proper sealing characteristics during the storage life of the evacuated containers and/or syringes so that they are useful when they are selected to be used in medical applications, for example. This is so even though such objects have been exposed to the elevated temperatures requied for autoclaving.

With the foregoing and additional objects in view, this invention will now be described in more detail and other objects and advantage will be apparent from the following description and the appended claims.

As purely illustrative of satisfactory results achieved in accordance herewith, and under satisfactorily and economically attractive conditions on commercial scale operations an elastomer system is formulated in accordance with the principles of this invention by combining dynamically vulcanized ethylene-propylene-diene terpolymers and polypropylene as the principle component, together with a butyl based rubber such as butyl rubber, halogenated butyl rubber, or partially cross-linked butyl rubber. A stabilizer is added to the composition in the form of a hindered amine such as, for example, bis[2,2,6,6-tetramethyl-4-piperidinyl] sebacate. As a processing aid for the composition, in accordance herewith, polyisobutylene may be added.

The principle component comprised of the dynamically vulcanized ethylene-propylene-diene terpolymer (EPDM) and polypropylene may be present within the range of between about 65 and 90 percent, and preferably within the range of between about 65 and 75 percent. The second major component of the composition, in accordance herewith in the form of a butyl based rubber such as butyl rubber, halogenated butyl rubber or cross-linked butyl rubber may be present within the range of between about 5 and 20 percent, and preferably within the range of between about 10 and 15 percent. The hindered amine may be present in the amount within the range of between about 0.01 and 5.0 percent, and preferably 0.1 and 0.5 percent, whereas the polyisobutylene, a processing aid, may be present within the range of between about 1 and 20 percent, and preferably 3 and 18 percent. In this connection, it should be understood that the polyisobutylene is utilized as a plasticizer.

The principle component comprised of cured EPDM and polypropylene PP may be obtained as Santoprene, a product of Monsanto Chemical Corporation. The hindered amine stabilizer may be Tinuvin, a product of Ciba Geigy, while the plasticizer may be Vistanex MML-80 or MML-100, a product of Exxon Corporation.

It is believed that the cured EPDM of the principle component EPDM/PP does not undergo a significant permanent deformation under stress and elevated temperature for autoclave conditions, which are, for example, 270° Farenheit for 15 minutes. However, the PP of this composition does. Therefore, the EPDM/PP is blended with the second component, in the form of butyl rubber, for example, which is a gum rubber. The high temperature gum rubber prevents the polypropylene from permanently deforming at autoclave temperature, thus maintaining elasticity of the final elastomer, in accordance herewith, and also higher viscosity than the polypropylene. The gum rubber acts, therefore, as a damping agent for the polypropylene. The molecules of the gum rubber are so compactly arranged that they show high damping characteristics at elevated temperatures required for autoclave conditions. By contrast, at molding process temperatures of 400° Farenheit, all of the components will melt and flow without any degradation. Thus, the composition can be processed under injection, compression, extrusion or blowmolding conditions.

As representative of one procedure for preparing a composition in accordance with this invention, one may note the following examples reciting representative procedures for formulating such a composition. It is to be understood, however, that these examples are being presented with the understanding that they are to have no limiting character on the broad disclosure of the invention as generally set forth herein, and as directed to those skilled in the art.

EXAMPLE I 1000 grams of Santoprene were introduced into an internal mixer maintained at a temperature of 400° F. and allowed to mix for five minutes. Thereafter, 50 grams of polyisobutylene was admixed with the Santoprene, and the mixture was blended for 10 minutes. The polyisobutylene acts as a plasticizer for the resulting composition. Then, 150 grams of a butyl rubber composition were added and the resulting mixture was blended for five minutes. In this connection, the butyl rubber may be introduced prior to the plasticizer. Finally, 1.155 grams of Tinuvin 770 was added, and the final mixture was blended for 5 minutes. Then, the resulting blended mixture was injection molded to produce 10 dozen 10 cc stoppers for use in syringes. The stoppers were then subjected to creep measurement before and after autoclave conditions. The strain was calculated by measuring the stopper outside diameter, the syringe barrel internal diameter, and the contact area of the stopper. After autoclaving at 270° F. for 15 minutes the residual strain in each stopper was calculated to be substantially 30 percent of the initial strain, well within the requirements necessary to maintain the required seal for passing conventional leakage tests for syringes.

EXAMPLE II 1000 grams of Santoprene were intoduced into an internal mixer maintained at a temperature of 400° F. and allowed to mix for five minutes. Thereafter, 35 grams of polyisobytylene was admixed with the Santoprene, and the mixture was blended for five minutes. Then 100 grams of a polyisobutylene-isoprene copolymer composition was added, and the resulting mixture was blended for five minutes.

Finally, 1.125 grams of Tinuvin 770 was added, and the final mixture was blended for five minutes. Then, the resulting blended mixture was injection-molded to produced ten dozen 10 cc stoppers for use in syringes. The stoppers were placed in conventional syringes and the iso leakage test was conducted before and after autoclaving. The autoclaving was performed at 270° F. for 15 minutes. The syringes of interest passed the leakage testing in this operation. Needless to say, the stoppers provide superior gas barrier properties, which is of interest in applications using stoppers in evacuated tubes.

Accordingly, and as will be apparent from the foregoing, there are provided in accordance herewith methods and compositions for imparting simultaneously to elastomers properties which enable the elastomers to withstand the effects of elevated temperatures required for autoclaving while the objects comprised of the elastomer are placed under stress. Thus, the objects may be formed, placed in the position in which they are to be used under stress and then autoclaved and the objects will maintain their proper elasticity, as required for use. There is no substantial degradation or breakdown in the properties of the objects formed from the compositions, in accordance herewith so that they maintain their properties over a period of time required for shelf life of the objects in which they are used such as evacuated tubes for taking blood samples and syringes for use invarious medical applications. These various medical devices may be constructed and autoclaved and they will maintain their sealing properties over a long period of time.

While the methods and compositions herein disclosed form preferred embodiments of the invention, this invention is not limited to those specific methods and compositions and changes can be made therein without departing from the scope of the invention which is defined in the appended claims. For example, a variety of uses for the elastomers of the invention will be apparent to the practitioner-in-the-art where high temperatures are involved in combination with constant sealing requirements. Such applications include high temperature, high pressure steam and water lines, as well as O-rings, labrinyth and other sealing applications.

What is claimed is:

1. A composition for producing elastomer objects capable of withstanding autoclave temperatures while avoiding high temperature creep, characterized by
   (a) within the range of between about 65 and 90 percent of a principle component comprised of dynamically vulcanized ethylen-propylene-diene terpolymer and polypropylene;
   (b) within the range of between about 5 and 20 percent of a butyl based rubber;
   (c) within the range of between about 0.01 and 5.0 percent of a hindered amine; and
   (d) within the range of between about 1 and 20 percent of a plasticizer.

2. A composition of claim 1, further characterized by
   (a) said principle component is present within the range of between about 65 and 75 percent.

3. The composition of claim 2, followed by
   (a) said second component is a member selected from the group consisting of butyl rubber, halogenated butyl rubber, and partially cross-linked butyl rubber present within the range of between about 10 and 15 percent.

4. The composition of claim 1, further characterized by
   (a) said hindered amine is bis[2,2,6,6-tetramethyl-4-piperidinyl] sebacate present within the range of between about 0.1 and 0.5 percent.

5. The composition of claim 1, further characterized by
   (a) said plasticizer is present within the range of between about 3 and 18 percent.

6. The composition of claim 5, further characterized by
   (a) said plasticizer is polyisobutylene.

7. A composition for producing elastomer objects capable of withstanding autoclave temperatures while avoiding high temperature creep, characterized by
   (a) dynamically vulcanized ethylene-propylene-diene terpolymer and polypropylene;
   (b) butyl based rubber;
   (c) a hindered amine; and
   (d) a plasticizer.

* * * * *